(12) United States Patent
McPherson et al.

(10) Patent No.: US 6,522,620 B1
(45) Date of Patent: Feb. 18, 2003

(54) DUAL FORMAT OPTICAL DISC

(75) Inventors: Alan J. McPherson, Chatsworth, CA (US); Charles Mecca, Jessup, PA (US)

(73) Assignee: Warner Music Group, Inc., Olyphant, PA (US)

( * ) Notice: Subject to any disclaimer, the term of this patent is extended or adjusted under 35 U.S.C. 154(b) by 0 days.

(21) Appl. No.: 09/446,786

(22) PCT Filed: Mar. 15, 1999

(86) PCT No.: PCT/US99/05709
§ 371 (c)(1),
(2), (4) Date: Dec. 27, 1999

(87) PCT Pub. No.: WO99/49458
PCT Pub. Date: Sep. 30, 1999

Related U.S. Application Data

(60) Provisional application No. 60/079,039, filed on Mar. 23, 1998.

(51) Int. Cl.$^7$ .............................. G11B 7/24; G11B 3/74
(52) U.S. Cl. ...................................... 369/275.3; 369/94
(58) Field of Search .......................... 369/275.4, 47.16, 369/275.3, 275.1, 111, 286, 13.46, 13.51, 283, 275.2, 281, 282, 290, 94; 428/694 ML, 694 MM

(56) References Cited

U.S. PATENT DOCUMENTS

| | | | | |
|---|---|---|---|---|
| 5,130,966 A | * | 7/1992 | Yoshio et al. | 369/47.16 |
| 5,214,627 A | * | 5/1993 | Nakashima et al. | 369/275.3 |
| 5,812,519 A | * | 9/1998 | Kawamura et al. | 369/275.1 |
| 5,815,333 A | * | 9/1998 | Yamamoto et al. | 360/60 |
| 5,923,640 A | * | 7/1999 | Takemura et al. | 369/275.3 |
| 6,031,808 A | * | 2/2000 | Ueno | 369/111 |
| 6,103,407 A | * | 8/2000 | Izumi et al. | 428/694 ML |

* cited by examiner

*Primary Examiner*—Ali Neyzari
(74) *Attorney, Agent, or Firm*—Gottlieb, Rackman & Reisman, P.C.

(57) ABSTRACT

A dual format optical disc (10) on which a musical selection is recorded in two different formats, such as CD and DVD. For example, standard 2-channel rendition of the selection can be stored CD format and a 5.1 channel rendition of the same selection can be recorded using a DVD format. The disc can be used in standard CD player with a provided spacer (44) arranged and constructed to allow the player's head (42) to read the CD information. The disc can also be played with a DVD player in which case the spacer (44) may be removed. Alternatively the disc can be formed with an integral disc, in which case, a DVD player includes an adjusting member to adjust reading head (40) of the player to read either a standard DVD disc or the inventive disc.

29 Claims, 3 Drawing Sheets

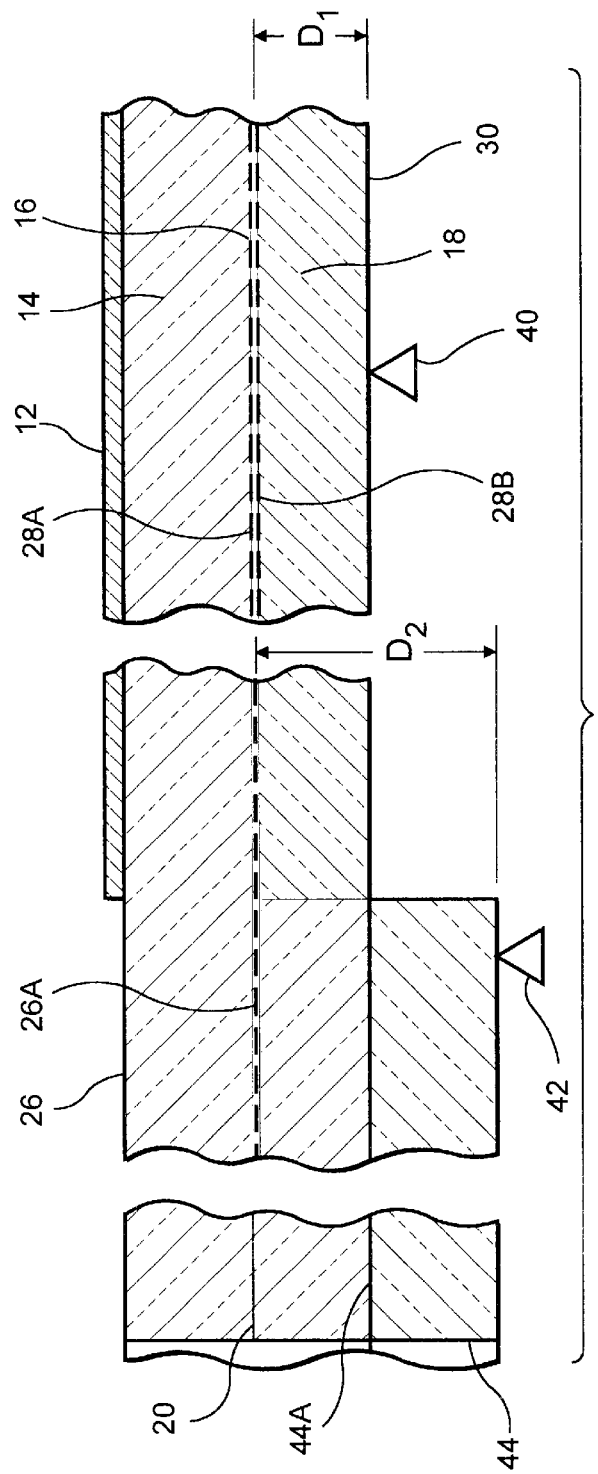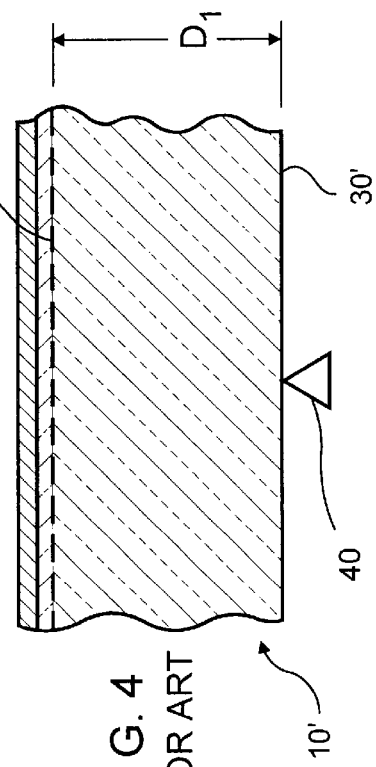

DUAL FORMAT OPTICAL DISC

This application claims priority to provisional application Serial No. 60/079,039 filed Mar. 23, 1998.

BACKGROUND OF THE INVENTION

A. Field of Invention

This invention pertains to an optical disc constructed and arranged to record and play selections in two different types or formats simultaneously. More specifically, the subject invention pertains to a single disc which may be used to record selections in, for example, a CD format and DVD format.

B. Description of the Prior Art

On certain occasions it is advantageous to distribute materials, such as musical selections, and the like, in different formats. For example, a music producer may want to distribute promotional information about a new musical album by a particular artist. Because different customers or other recipients may have different media for reviewing this information, the producer generally generates the promotional materials using different media and standards. Frequently, all the recipients receive a single package containing the promotional material in two or more standards, so that they can pick and chose which format they want to review, depending largely on their capability. For instance, musical selections can be reviewed either on a CD if only the audio track is of interest, or on DVD, if both the audio and video information is desired. Similarly, computer software may be distributed on CD ROM or a DVD ROM with the first holding a versions of a computer program with less features, and hence requiring data space then a full version on he DVD ROM. Another type of disc is used to deliver audio selections in two different formats. Standard CD format would be used for a two channel stereo rendition of a musical selection, and 5.1 or 6 channel stereo rendition renditions provided in the DVD format. A consumer may buy this disc originally to be played on a standard two channel stereo system but can play the disc as well on a multichannel (i.e. 5.1 or 6 channel) system as well later when he upgrades his equipment.

However, since the CD and DVD discs are the same general dimensions and other physical characteristic, it would be advantageous if information using both formats or standards could be recorded onto and replayed from a single disc.

OBJECTIVES AND SUMMARY OF THE INVENTION

In view of the above it is an objective of the present invention to provide a disc recorded with information in two different formats.

A further objective is to provide a disc which can be replayed using an appropriate player device, as required.

Yet another objective is to provide a disc assembly which may be used to adjust the position of the disc [during replay] to insure optimal replay.

Other objectives and advantages of the invention shall become apparent form the following description. Briefly, a disc constructed in accordance with this invention includes two regions, each region being allocated for the recordal of digital information of a particular format. The two regions are disposed concentrically about the center of the disc. In one embodiment of the invention, a removable spacer is provided which is used to position the disc for reading by an appropriate player. For instance, in case a disc used for both CD and DVD formats, a spacer is provided for adjusting the position of the disc for reading one of the formats (for example the CD format).

BRIEF DESCRIPTION OF THE DRAWINGS

FIG. 3 is an enlarged side section view of the disc of FIGS. 1 and 2;

FIG. 4 shows a cross-sectional view of a prior art standard CD;

DETAILED DESCRIPTION OF THE INVENTION

Figure 1:
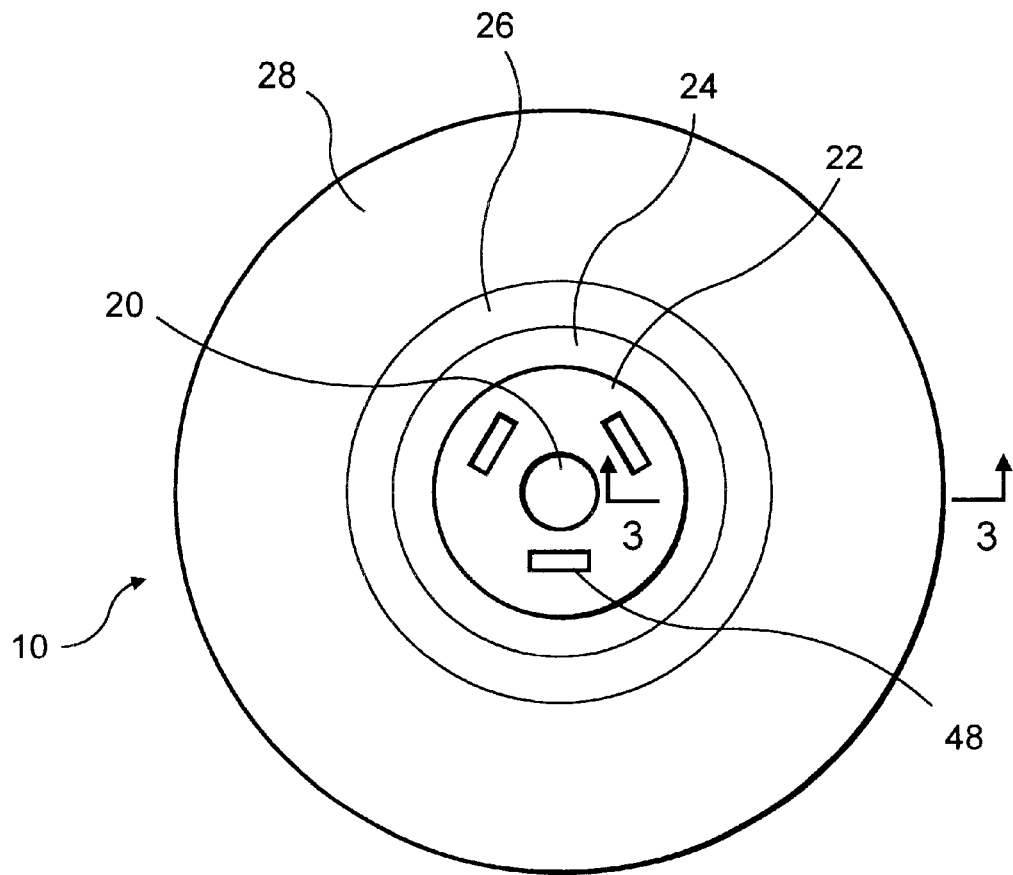
FIG. 1 shows a bottom plan view of a disc constructed in accordance with this invention.
Figure 2:
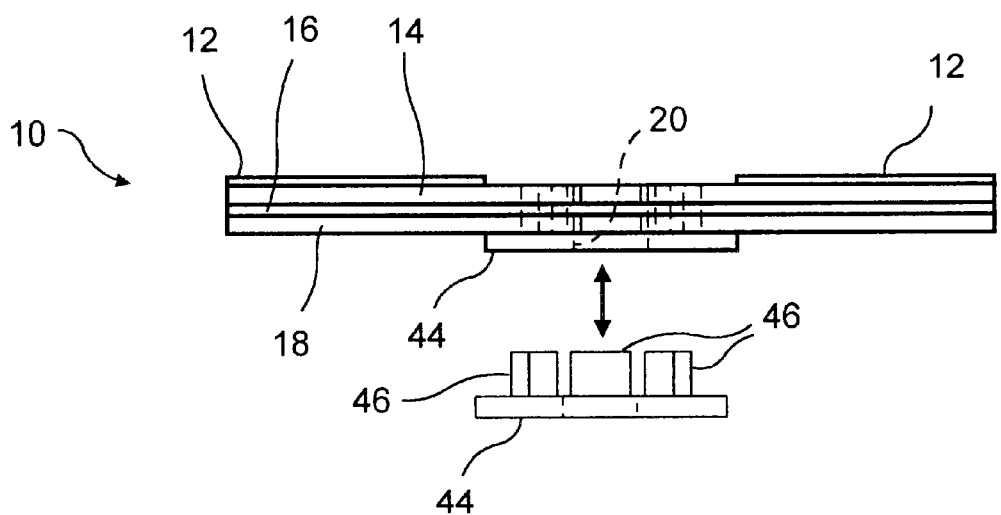
FIG. 2 is a side view of the disc of FIG. 1.

Referring now to FIGS. 1 and 2, a disc 10 constructed in accordance with this invention has the same general dimensions as a standard DVD. The disc 10 has the following layers: a top layer 12 which may include a label for identifying the disc, top substrate 14 which provides strength and support for the disc, a read out, or data substrate 16, and a bottom layer 18. Importantly, the data on the disc is recorded on the disc in two different formats. For example, data may be recorded in a DVD format and in a CD format. Information about the disc 10 may be etched or otherwise impressed on the top surface of disc 10 in which case the label layer 12 may be omitted.

As shown in FIG. 1 the disc 10 has a standard central hole 20, and several concentric annular regions extending sequentially from the central hole. More particularly, as shown in FIG. 1, immediately adjacent to the central hole 20 is a hub 22. This hub 22 reinforces the disc, and it may also be used to imprint additional information about the disc. Data on the data layer or substrate 16 is recorded radially outwardly of hub 22. The first region containing data is region 24. This region is relatively narrow and is used to store various standard digital information about the disc 10 and its contents. Next is an annular region 24 used to record CD information. Finally, the outermost annular region 26 is used to record DVD information. As seen in FIG. 3, both the DVD and the CD information are recorded on the data layer 16. The DVD information may be recorded using a single substrate, or as shown in FIG. 3, using two substrates 28A and 28B which are axially offset by about 0.055 mm. The CD information is recorded on a substrate 26A which can be co-planar with either of the substrates 28A or 28B. From a practical point the CD substrate 28A is pressed at the same time as the corresponding DVD substrate. Typically the layer 16 is at a distance D1 from the bottom edge 30 of the disc 10 of about 0.6 mm.

Disc 10, as mentioned above, is preferably used to distributed data related to the same musical or audio/visual selection using two different formats. For example, the disc 10 may be used to distribute a demo version of a song as performed by a particular artist. The demo in this case includes information in the CD format recorded in region 26 which may be pure audio information. The demo also includes information in DVD format on region 28 which is audio/video information. For example the CD information may require about 400 Mbytes resulting in an audio program of about 40 minutes. The DVD information may require about 3,000 Mbytes at max. bitra to result in an audio/video program or a 5.1–6 channel stereo program of about 30–40 minutes.

The recipient of the disc can reply information from either region, depending on his equipment. Thus for example, a person having a standard CD player places the disc 10 within this type of unit and the unit then replays the pure audio program of the performance. A person with a DVD player can replay the video and see as well as hear the performance. Alternatively, he may play the recorded musical selection on 5.1 or 6 channels.

One problem with the arrangement described so far is that there is a sufficient difference between a CD and a DVD so that the disc 10 may not be playable on both a CD and a DVD player. More particularly, as shown in FIG. 3 a CD player is provided with a head 40 disposed adjacent to surface 30' and constructed and arranged to read the CD data 26' at 1.15 mm. On the other hand, a standard DVD player is adapted to read DVD data at 0.55±0.025 mm from surface 30 depending on whether the substrate 28A or 28B is to be read.

FIG. 4 depicts a partially enlarged side view of a standard CD 10' with a data substrate 26A' disposed at a distance D2 which is about 1.15 mm from the bottom surface. As seen on this Figure, this disc 10' is played with a head 42 which therefore must be adapted to read data at a distance D2 has a data layer 26A' at distance D2. Obviously therefore head 42 may not be able to read the CD data in region 26 when the disc 10 is placed in a standard CD player. This problem is resolved by adding a transparent spacer 44 to the disc 10. Preferably spacer 44 is annular having a central hole 46 disposed under central hole 20 and a thickness of about 0.6 mm and an outer diameter sufficient so that the spacer 44 is radially coextensive with region 26. Therefore when the disc 10 is placed in a standard CD player, head 42 is positioned below where it normally would be with respect to the bottom surface 30 of the disc 10, but correctly positioned to read the data in region 26.

Spacer 44 is preferably made of a plastic material. In use, spacer 44 should be attached to the disc 10. One way of attaching is to provide it with a plurality of tongues 46 extending generally axially (as shown in FIG. 2). The disc 10 is then provided with appropriate apertures 48 receiving the tip of the tongues 46. The spacer 44 then can be snapped to the disc 10 by inserting the tongues into aperture 48. As described above, the disc 10 is provided with spacer 44 when it is to be played on a CD player. For a standard DVD play, the spacer 44 is removed.

Alternatively, the spacer 44 is provided with a high gloss on its top surface 44A which provides an adhesion between the spacer 44 and surface 30. Additionally, the spacer 44 is very thin and light and accumulates static electrical charge. Because of its light weight, the spacer 44 is then maintained in contact with the disc 10 simply because of the static charge built up on it. The spacer 44 may be provided with an adhesive layer so that when it is pressed on the disc 10 it remains in place. This configuration is particularly useful for discs which are expected to be played only once or only a few times since under these conditions, the disc will be probably played only on a DVD player (in which the spacer is not required and is discarded) or only on a CD player in which case the spacer 44 is used as described above.

Figure 5:
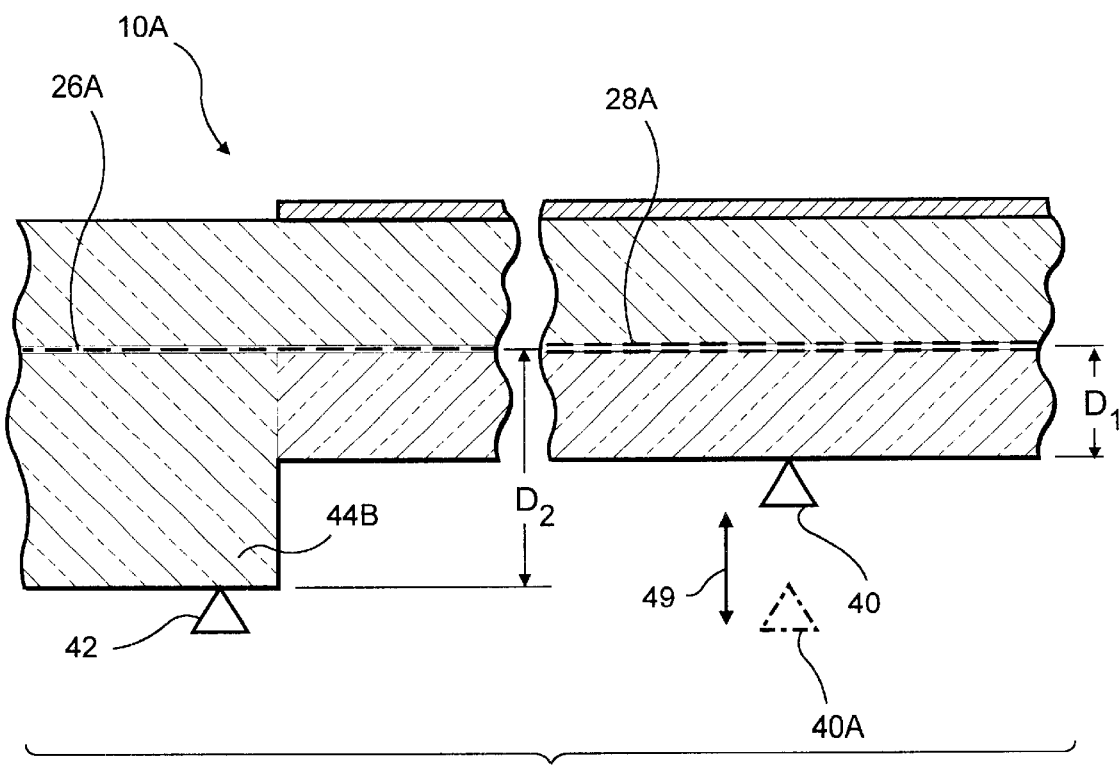
FIG. 5 is first alternate embodiment of the invention covering a dual sided disc.

In an alternate embodiment shown in FIG. 5, instead of a separate spacer 44, the disc 10 may be made with an axial extension 44B integral with layer 18 but increasing the width of the disc by 0.06 mm under region 26 as compared to the normal or standard width under region 28. In this embodiment, head 42 is automatically positioned correctly to read the data the CD region 26. However in this instance, the player (not shown) is modified to include a motor 49 adapted to reciprocating head 40 from the position shown to the position 40A. In this manner, for standard DVD discs, the head 40 is positioned at 40A. For disc 10A, the head is positioned at 40 to read the DVD data. Of course the control of the player is further modified so that the DVD section is read only starting with the boundary between sections 26 and 28 and extending radially outwards thereof.

Figure 6:
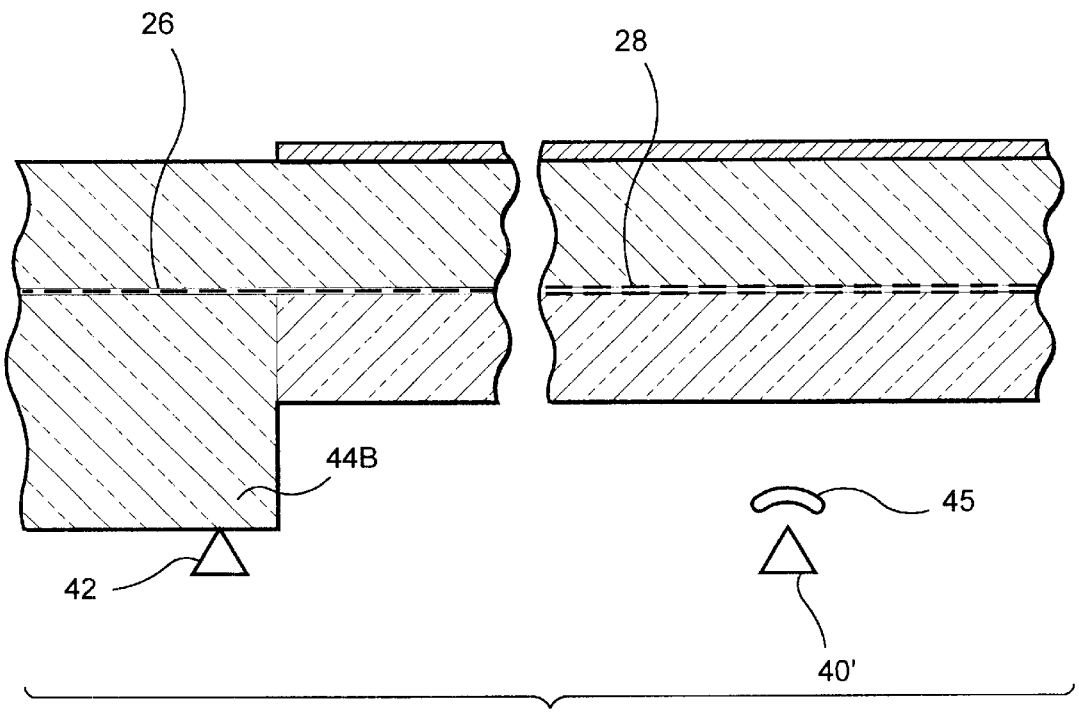
FIG. 6 shows a second alternate embodiment of the invention covering a dual sided disc.

Another embodiment of the invention is shown in FIG. 6. In this embodiment, the disc 10A is again provided with an axial extension 44B. In this embodiment, a DVD player is used which has its head 40' modified so that it includes a lense 45 or other means which allows the head 45 to read the date at layer 28A, 28B even though the head 40' is disposed at a further distance then normal in a DVD player.

Obviously numerous modifications can be made to this invention without departing from its scope as defined in the appended claims.

We claim:

1. A dual format optical disc system comprising:
   a circular body having a center;
   a first data region imbedded in said body and disposed annularly about said center, said first data region including a data substrate defining digital information corresponding to a first format; and
   a second data region imbedded in said body and disposed annularly about said center, said second data region including another data substrate defining digital information corresponding to a second format;
   wherein said circular body includes a first annular region corresponding to said first data region and having a first thickness, and a second annular region corresponding to said second data region and having a thickness different than said first thickness.

2. The disc system of claim 1 wherein said second data is disposed radially outwardly of said first data region.

3. The disc system of claim 1 wherein said first region includes data using a CD format and said second region includes data in a DVD format.

4. The disc system of claim 1 further comprising a spacer corresponding to said first annular region.

5. The disc system of claim 4 wherein said spacer is removably attached to said circular body.

6. The disc system of claim 4 wherein said spacer is integrally formed with said body below said first region.

7. The disc system of claim 4 wherein said spacer includes attaching members for attaching said spacer to said circular body.

8. A dual format optical system for playing a musical selection in one of a first and a second formats, said system comprising:
   a disc having a circular body including a first substrate, a second substrate and a data substrate disposed between said first and second substrates, at least one of said first and second substrates being transparent; said data substrate including a first annular region containing data indicia in said first format and a second annular region disposed around said first annular region and containing data indicia in said second format;
   wherein said disc has a different thickness in said first annular region than in said second annular region.

9. The system of claim 8 further comprising a spacer disposed substantially coextensively with one said first and second annular regions, said spacer being transparent.

10. The system of claim 9 wherein one of said formats is a CD format and the other of said formats is a DVD format, said spacer being substantially coextensive with the annular region with said CD format.

11. The system of claim 9 wherein said spacer is removably attached to said body, so that said disc can be played on a CD player with said spacer associated with said disc, and wherein said disc can be played on a DVD player with said spacer removed from said disc.

12. The system of claim 9 wherein said disc has an axial extension forming said spacer.

13. The disc system of claim 3 wherein said first annular region is thicker than said second annular region.

14. The disc system of claim 1 wherein said first annular region is thicker than said second annular region.

15. The disc system of claim 3 wherein said first annular region is thicker than said second annular region.

16. The system of claim 8 wherein said spacer is removably attached to said body by electrostatic adhesion.

17. The system of claim 8 wherein said spacer is glued to said body.

18. The system of claim 8 wherein said spacer includes a plurality of fingers and said body has apertures for receiving said fingers.

19. A dual format optical system for playing a musical selection in one of a first and a second formats, said system comprising:
   a disc having a circular body including a first substrate, a second substrate and a data substrate disposed between said first and second substrates, at least one of said first and second substrates being transparent; said data substrate including a first annular region containing data indicia in said first format and a second annular region disposed around said first annular region and containing data indicia in said second format;
   wherein said disc in said first annular region has first thickness and wherein said disc in said second annular region has a second thickness different than said first thickness.

20. The system of claim 19 wherein said second substrate is transparent and has a first dimension in said first annular region which is substantial identical to the thickness of a corresponding second substrate of a first format standard disc.

21. The system of claim 19 wherein said second substrate is transparent and has a second dimension in said second annular region which is substantial identical to the thickness of a corresponding second substrate of a second format standard disc.

22. The system of claim 19 wherein said second substrate has a thickness of about 1.15 mm in said first annular region.

23. The system of claim 19 wherein said second substrate has a thickness of about 0.6 mm in said second annular region.

24. The system of claim 19 wherein said second substrate has a thickness of about 1.15 mm in said first annular region and a thickness of about 0.6 mm in said second annular region.

25. The system of claim 19 wherein said body further comprises a removable spacer coextensive with said first annular region.

26. The system of claim 25 wherein said spacer is removably attached to said second substrate.

27. The system of claim 25 wherein said spacer is adhesively attached to said second substrate.

28. The system of claim 25 wherein said spacer includes a mechanical member for attaching said spacer to said second substrate.

29. The system of claim 28 wherein said first and second substrates are formed with an aperture and said mechanical member engages said aperture.

* * * * *